March 10, 1959  C. T. WALLIS  2,876,478
WINDSHIELD WIPER BLADE ASSEMBLY
Filed May 10, 1954  2 Sheets-Sheet 1
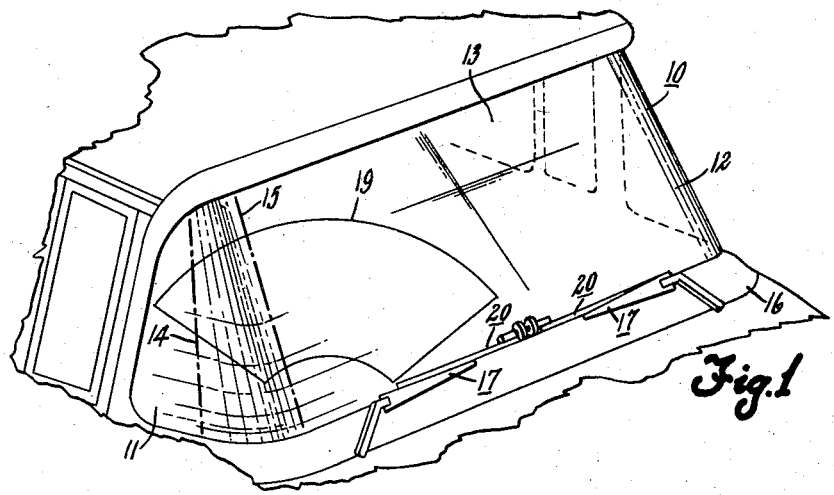
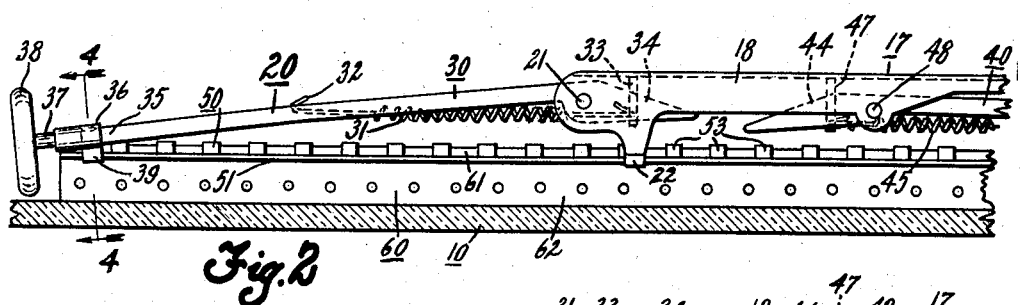
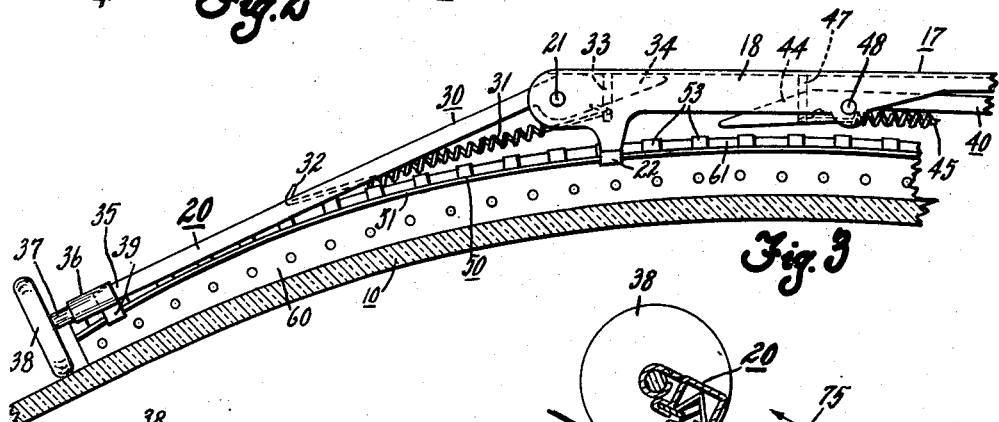
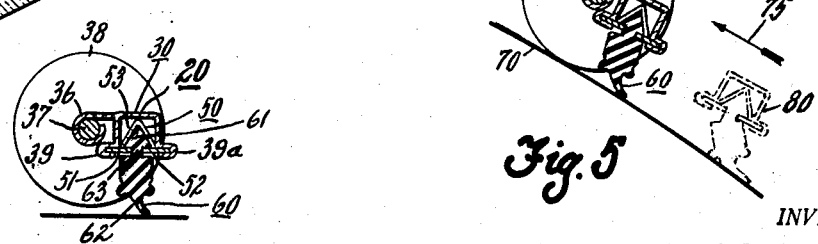
INVENTOR.
CYRIL T. WALLIS
BY
George H. Strickland
HIS ATTORNEY

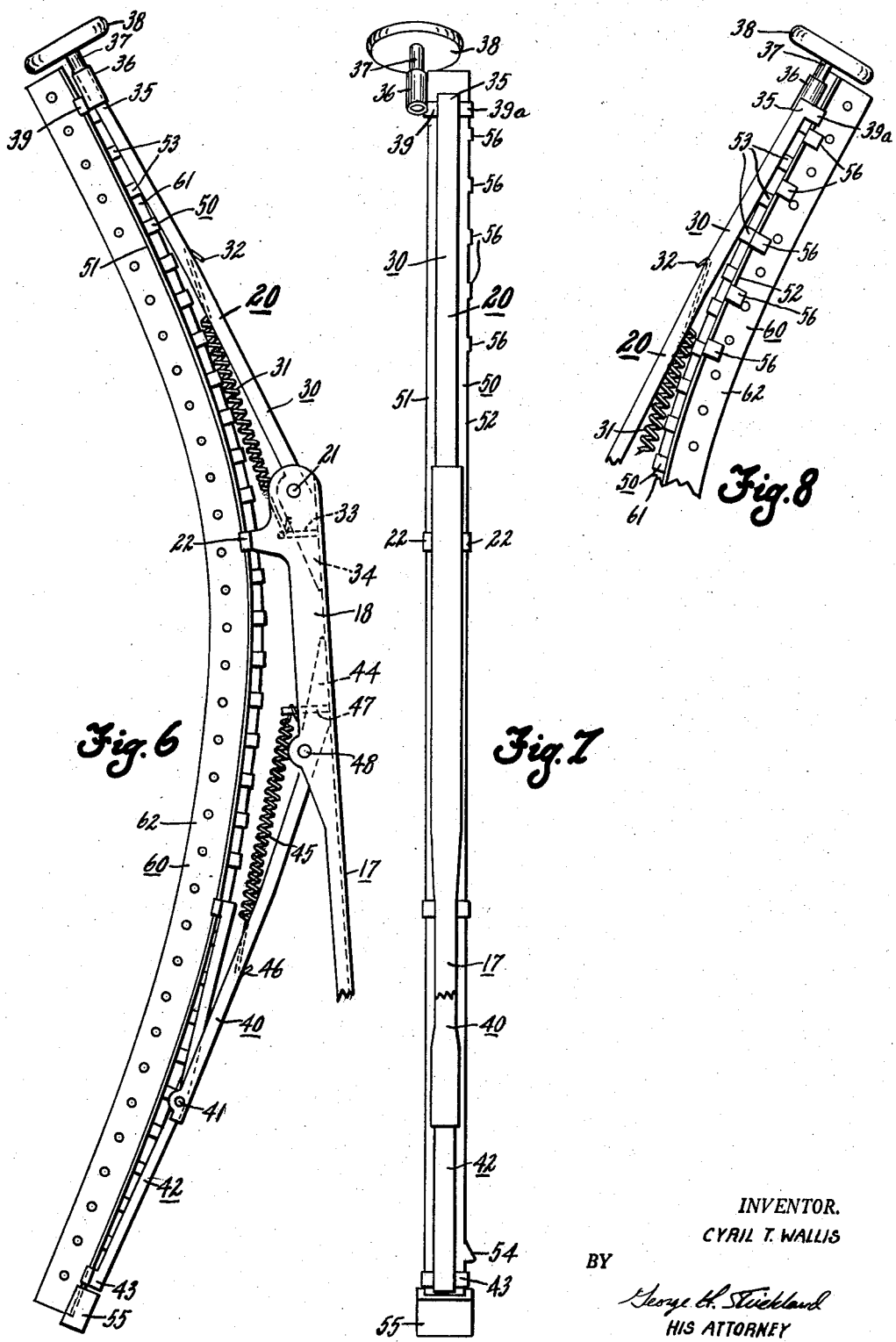

United States Patent Office 2,876,478
Patented Mar. 10, 1959

2,876,478
WINDSHIELD WIPER BLADE ASSEMBLY

Cyril T. Wallis, Brockport, N. Y., assignor to General Motors Corporation, Detroit, Mich., a corporation of Delaware Application May 10, 1954, Serial No. 428,562

19 Claims. (Cl. 15—245)

This invention pertains to window cleaners, and particularly to a wiper assembly adapted to clean a curved surface as well as a substantially planar surface.

Heretofore, windshield wiper blades have been designed for cleaning curved window surfaces, one type of blade being disclosed in the Anderson Patent No. 2,596,063. However, this type of blade was neither designed, nor does it properly clean, a sharply curved window surface, commonly known as a wrap around windshield. In this type of windshield, the end sections are disposed in spaced, substantially parallel, vertical planes on opposite sides of a vehicle, and the window extends throughout an arcuate distance of substantially 180°. With present day wiper blades, it is impossible to clean substantial portions of the sharply curved end sections due to the fact that the wiping element tilts excessively, or crowds the windshield surface to such an extent that present day wiper motors cannot effect uniform blade movement. This invention pertains to a blade assembly including means for preventing crowding of the wiping element, or squeegee, as well as means particularly adapted for cleaning a sharply curved surface. Accordingly, among my objects are the provisions of a wiper blade assembly capable of effectively cleaning the front and side sections of a wrap around windshield; the further provision of a wiper assembly including means for preventing crowding of the wiping element against the surface to be cleaned; and the still further provision of a blade assembly which is spring biased so as to normally deform the wiping element to a concave configuration.

The aforementioned and other objects are accomplished in the present invention by providing a wiper blade assembly with a pair of spring biased, pivotally mounted side arms, and means attached to the end of the outer side arm for preventing crowding of the wiping element against the surface to be cleaned by automatically limiting the angle of tilt thereof. Specifically, the wiper blade assembly includes pressure applying means which may be constituted by an integral part of a conventional arm; a pair of side arms, or levers, which are pivotally connected to the pressure applying means; a yoke which is pivotally connected intermediate its ends to the free end of the inner side arm, opposite ends of the yoke being movably connected with a flexible backing strip, the free end of the outer side arm being slidably connected with the flexible backing strip; a pair of tension springs, which interconnect spaced points on the pressure applying means and the side arm so as to normally draw the side arms inwardly; and a resilient wiping element, or squeegee, composed of elastomeric material. The end of the outer side arm, which is slidably connected with the backing strip has attached thereto a bracket, which carries a stub shaft about which a roller is rotatably journaled.

The roller performs somewhat the same functions as the roller disclosed in my copending application Serial No. 428,563, now Patent No. 2,824,331, filed of even date herewith, in that it prevents crowding of the squeegee against the sharply curved sections of the windshield by limiting tilting thereof relative to the backing strip. The blade assembly of this invention is also related to the assembly disclosed in copending application Serial No. 428,561, filed of even date herewith in the name of Grant E. Sanden et al., and, accordingly, a plurality of fingers are attached to one side of the backing strip, which fingers are engageable with the squeegee and assists the roller in preventing crowding thereof. However, while in the aforementioned application Serial No. 428,561, the roller may, or may not, engage the windshield surface during outward movement of the wiper blade, in the instant blade assembly, the roller is arranged to engage the windshield during both the inward and outward strokes thereof.

Further objects and advantages of the present invention will be apparent from the following description, reference being had to the accompanying drawings wherein a preferred embodiment of the present invention is clearly shown.

In the drawings:

Fig. 1 is a fragmentary view, in perspective, illustrating a vehicle with a wrap around windshield, and depicting the windshield area to be cleaned.

Fig. 2 is a fragmentary composite view illustrating operation of the wiper assembly of this invention when cleaning a substantially planar surface.

Fig. 3 is a view similar to Fig. 2 showing the wiping operation on a curved surface.

Fig. 4 is a sectional view taken along line 4—4 of Fig. 2.

Fig. 5 is a composite view illustrating the operation of a conventional wiper blade assembly on a sharply curved surface, and operation of the wiper blade assembly of this invention on the same sharply curved surface.

Fig. 6 is a side view, in elevation, of a blade assembly constructed according to this invention.

Fig. 7 is a plan view, in elevation, of the blade assembly of Fig. 6.

Fig. 8 is a fragmentary view, in elevation, of the opposite side of the wiper blade assembly depicted in Fig. 6.

With particular reference to Fig. 1, a portion of a motor vehicle is depicted, the vehicle being of the type including a wrap around windshield generally indicated by the numeral 10. It will be observed that the windshield is of the type which is being used on some of the present day automobiles, and, thus, includes end sections 11 and 12 which are disposed in spaced, substantially parallel, vertical planes on opposite sides of the vehicle. The end sections 11 and 12 are formed integral with a curved front portion 13, from which it may be seen that the windshield extends throughout an arcuate distance of substantially 180°. In a windshield of this character, the portion between dotted lines 14 and 15 is commonly referred to as the "hump" in that it has a very pronounced curvature.

In a conventional manner, the vehicle includes a cowl or rail portion 16 through which spaced, oscillatable wiper shafts, not shown, project. Each wiper shaft has attached thereto a wiper arm assembly 17 of conventional construction, and, thus, it will be appreciated that the wiper arms 17 are capable of pivotal movement away from the surface of the windshield, and are spring biased against the surface of the windshield so as to apply wiping pressure to blade assemblies 20 which are operatively connected to the ends thereof.

With particular reference to Figs. 6 through 8, the wiper blade assembly 20 of this invention will be described. Initially, it should be noted that in contradistinction to the blade assembly disclosed in the aforementioned copending application Serial No. 428,561, the instant wiper blade assembly 20 is not adapted for connection with the standard wiper arms, in that the wiper arm and blade are rigidly connected, rather than being detachably connected. Furthermore, the arm 17 includes a portion 18 constituting the means for applying wiping pressure to the blade, as well as forming a support for the pressure distributing means of the wiper blade assembly. The portion 18 may be either integral with the arm 17, or be a separate member. Thus, the wiper blade assembly 20 includes an outer side arm, or lever, 30 and an inner side arm, or lever, 40. One end of the outer side arm 30 is pivotally connected at 21 to the portion 18 of the wiper arm 17. The other end of the side arm 30 is slidably connected to the outer end of a flexible backing strip, generally depicted by numeral 50.

With particular reference to Fig. 4, the slidable interconnection between the outer side arm 30 and the flexible backing strip 50 is clearly shown, from which it may be seen that the flexible backing strip 50 is constructed from an integral piece of metal and includes a pair of longitudinally extending, spaced flanges 51 and 52, as well as a plurality of spaced eyelets, or hooks, 53. The free end of the outer side arm 30 is formed with a pair of inwardly extending flanges 39 and 39a, which embrace flanges 51 and 52 of the backing strip. Thus, during pivotal movement of the side arm 30, as shown in Figs. 2 and 3, relative longitudinal movement will occur between the flexible backing strip and the side arm 30.

One end of side arm 40 is pivotally connected to arm portion 17 at 48, and the free end of the inner side arm 40 is pivotally connected at 41 to the intermediate portion of a yoke 42, opposite ends of which are movably connected to longitudinally spaced points on the flexible backing strip 50. The interconnections between the ends of the yoke 42 and the backing strip are similar to the connection described in conjunction with side arm 30. Thus, during pivotal movement of the side arm 40, relative longitudinal movement will occur between the yoke 42 and the backing strip. However, in this instance, the backing strip is formed with a tang 54 adapted to cooperate with the end 43 of the yoke 42 so as to limit relative longitudinal movement therebetween.

The side arm 30, and the side arm 40 are also formed with tang portions, 34 and 44, respectively, which are arranged to abut the inner peripheral surface of the portion 18 so as to limit pivotal movement of the side arms inwardly, as viewed in Fig. 6. The side arm 30 is normally maintained in an inward position by means of a tension spring 31, one end, 32, of which is anchored to a point on the side arm 30, and the other end of which is anchored to a hook 33 carried by the arm 17. Similarly, the side arm 40 is normally maintained in an inward position by means of a tension spring 45, one end, 46, of which is anchored to a point on the arm 40, and the other end of which is anchored to a hook 47 carried by the arm 17. It should be noted that the ends of spring 31 and 45, respectively, which are attached to the arm 17 are below and longitudinally spaced from the pivotal connections 21 and 48 between the arm 17 and the side arms 40 and 30, respectively. Accordingly, during outward pivotal movement of the side arms 30 and 40, the springs 31 and 45, respectively, will move over different arcs, the arrangement being such that the mechanical advantage of the springs 31 and 45 becomes less as the side arms approach the horizontal position, as depicted in Fig. 2.

The backing strip 50 is constructed according to conventional practice, and is arranged to support a conventional wiping element, or squeegee, 60 composed of elastomeric material. The backing strip 50 and the squeegee 60, when assembled, constitute a squeegee unit. The squeegee, as shown in Fig. 4, includes a retention portion 61, generally triangular in cross section, a wiping portion 62, and a reduced neck portion 63, which is integral with the retention and wiping portions 61 and 62, and which pivotally interconnects the same. The wiping element 60 is readily flexible whereby it will conform to the curvature of any surface to be cleaned. Furthermore, the wiping element 60 is constructed so that it may be interconnected with the flexible backing strip 50 by inserting one end of the triangular portion 61 thereof into one of the hooks 53, so that the flanges 51 and 52 are received in the grooves between portions 61 and 62 of the squeegee. The squeegee may then be slid longitudinally relative to the backing strip, after which an abutment member 55, composed of hard, rubber-like material is interlocked with the inner end of the backing strip 50 so as to prevent separation of the backing strip and the squeegee. Thus, in the wiper blade assembly of this invention, should it become necessary to replace a worn squeegee, it is only necessary to remove the abutment member 55 and slide the squeegee longitudinally relative to the backing strip, and, thereafter replace the same with a new squeegee.

The outer end 35 of the outer side arm 30 has attached thereto a bracket 36, which carries a stub shaft 37. A roller 38 is rotatably supported on the stub shaft 37. The roller 38 is positioned so that it will engage sharply curved portions of the surface to be cleaned so as to limit tilting movement of the squeegee 60 relative to the backing strip 50 and thereby prevent the crowding of the squeegee against the windshield surface. It is to be understood that the squeege 60 is freely tiltable relative to the backing strip by reason of the reduced neck portion 63 thereof. In addition, it may be seen from Figs. 7 and 8 that the side of the flexible backing strip opposite that of the bracket 36, is formed with a plurality of inwardly extending fingers 56, which also function to limit tilting of the squeegee element, as will be pointed out more particularly hereinafter. The arm 17 also includes a pair of inwardly extending ear portions 22, which are operatively connected with the flexible backing strip 50 in a conventional manner, the ears 22 constituting an additional pressure applying means.

Exhaustive studies have indicated that the only portion of a wrap around windshield which can be properly cleaned with present day wiper blade assemblies of the type disclosed in the aforementioned patent, is that portion between the cowl 16, as viewed in Fig. 1, and dotted line 15, i. e. about 90°. However, with the wiper blade assembly of this invention, substantial portions of the sharply curved side sections can be effectively cleaned, and the wiper blades may traverse an arc from the cowl 16 of substantially 160°. The outer side arm 30, which traverses the most sharply curved portions of the windshield is designed to follow the changing curvature so as to effect adequate cleaning thereof. The inner side arm construction 40 is incorporated so that the blade assembly will also follow the changing curvature at the inner end of the wiper blade. The tension spring arrangements, as employed in the instant blade design, can be adjusted so that the force required to deflect the side arms from their normal positions, as shown in Fig. 6, will increase, decrease or remain substantially constant. Preferably, the force required is substantially constant, and the normal position of the blade results in a concave configuration of the squeege, as depicted in Fig. 6.

As pointed out in the aforementioned copending applications, studies have indicated that one of the principal reasons why present day wiper blade assemblies cannot be used to properly clean sharply curved surfaces, resides in the fact that the wiping portion 62 of the squeegee tilts excessively. When the squeegee tilts excessively, it crowds the windshield and imposes an overload on the wiper motor, such that uniform blade movement, and, hence, proper cleaning of the windshield cannot be effected.

With particular reference to Fig. 5, the line 70 depicts the actual curvature of the windshield at the outer end of the blade, as indicated by line 19 in Fig. 1. The arrow 75 indicates the direction of wiper blade movement. The phantom wiper blade assembly 80 is of the type presently being used, while the wiper blade assembly 20 is constructed according to this invention. From an inspection of the phantom blade 80, it will be noted that the squeegee has tilted excessively, thereby imposing an overload on the wiper motor and resulting in ineffective cleaning of the curved surface. In the present invention, the roller 38, in combination with the fingers 56 limits the angle of tilt of the wiping portion 62 to substantially 10° relative to the surface being wiped. This feature in combination with the pivotally mounted, pressure applying side arms results in a blade assembly which is capable of cleaning an arcuate distance of 160° from the cowl 16.

The roller 38 is arranged to engage the windshield during clockwise, as well as counterclockwise movement of the blade assemblies 20, as viewed in Fig. 1. However, as the principal tendency of the blade squeegee element to crowd the windshield only occurs during movement of the blades from the outer end of the stroke towards the cowl, the fingers 56 are only arranged to limit tilting movement of the squeegee during this inward movement. In an actual construction, the axis of the roller 38 may be spaced approximately 3/16" from the wiping edge of the squeege in a direction so that the roller leads blade movement during blade movement towards the cowl, and lags during outward blade movement.

While the embodiment of the present invention as herein disclosed, constitutes a preferred form, it is to be understood that other forms might be adopted.

What is claimed is as follows:

1. A windshield cleaner comprising, pressure applying means, a pair of members having their ends movably connected to said pressure applying means, resilient means interconnecting spaced points on said members and said pressure applying means for normally maintaining a predetermined angular relationship therebetween, and a squeegee unit freely flexible throughout its length and indirectly connected at longitudinally spaced points to one of said members.

2. A wiper assembly for cleaning a surface comprising, a wiper arm, a pair of members having their ends movably connected at spaced points to said arm, resilient means interconnecting spaced points on said members and said arm for normally maintaining a predetermined angular relationship therebetween, a yoke movably connected to one end of one of said members, and a flexible squeegee unit readily conformable to the surface to be cleaned and operatively interconnected at longitudinally spaced points to said other member and said yoke.

3. A windshield cleaner including, pressure applying means, a pair of members having their ends pivotally connected to said pressure applying means, resilient means interconnecting spaced points on said members and said pressure applying means for normally maintaining a predetermined angular relationship therebetween, and a squeegee unit freely flexible throughout its length and indirectly connected at longitudinally spaced points to one of said members, said squeegee unit also being directly connected to at least one point of said pressure applying means and to the other of said members.

4. A windshield cleaner including, pressure applying means, a pair of members having their ends pivotally connected to said pressure applying means, resilient means interconnecting spaced points on said members and said pressure applying means for normally maintaining a predetermined angular relationship therebetween, a squeegee unit readily conformable to the surface to be cleaned, and a yoke connected intermediate its ends to one end of one of said members, said squeegee unit being directly interconnected at longitudinally spaced points with said yoke and the other of said members.

5. A windshield cleaner including, pressure applying means, a pair of members having their ends pivotally connected to said pressure applying means, resilient means interconnecting spaced points on said members and said pressure applying means for normally maintaining a predetermined angular relationship therebetween, a flexible squeegee unit readily conformable to the surface to be cleaned, and a yoke movably connected intermediate its ends to the free end of one of said members, said squeegee unit being movably connected to the ends of said yoke and the other of said members, said squeegee unit also being directly connected with said pressure applying means.

6. A wiper for cleaning a curved surface comprising, a resilient wiping element conformable to the surface to be wiped, a flexible backing strip for supporting said wiping element, said wiping element being freely tiltable relative to said backing strip, means for applying wiping pressure to said backing strip, a pair of members having their inner ends movably connected to said pressure applying means, the outer end of one member being indirectly connected to said backing strip and the outer end of the other member being directly connected with said flexible backing strip, and resilient means interconnecting spaced points on said pressure applying means and said members for normally deforming said flexible backing strip and wiping element.

7. A wiper for cleaning a curved surface comprising, a resilient wiping element conformable to the surface to be wiped, a flexible backing strip for supporting said wiping element, said wiping element being freely tiltable relative to said backing strip, means for applying wiping pressure to said backing strip, a pair of members having their inner ends movably connected to said pressure applying means, the outer end of one member being indirectly connected to said backing strip and the outer end of the other member being directly connected with said flexible backing strip, and a pair of springs, the inner ends of said springs being connected with said pressure applying means at points spaced from the movable connection between said pressure applying means and said members, the outer ends of said springs being connected to points on said members whereby said flexible backing strip and wiping element are normally deformed.

8. A wiper for cleaning a curved surface comprising, a resilient wiping element conformable to the surface to be wiped, a flexible backing strip for supporing said wiping element, said wiping element being freely tiltable relative to said backing strip, means for applying wiping pressure to said backing strip, a pair of members having their ends movably connected to said pressure applying means, the free ends of said members being operatively connected with said flexible backing strip, and a pair of springs, the inner ends of said springs being anchored to said pressure applying means at points spaced from and closer to the flexible backing strip than the center of movable connection between said members and said pressure applying means, the outer ends of said springs being anchored to points on said members.

9. A wiper for cleaning a curved surface comprising, a resilient wiping element conformable to the surface to be wiped, a flexible backing strip for supporting said wiping element, said wiping element being freely tiltable relative to said backing strip, means for applying wiping pressure to said backing strip, a pair of members having having their ends movably connected to said pressure applying means, the free ends of said members being opertively connected with said backing strip, resilient means interconnecting spaced points on said pressure applying means and said members for normally deforming said backing strip and wiping element, and cooperable means on said members and said pressure applying means for limiting deformation of said backing strip and wiping element by said resilient means.

10. A wiper for cleaning a curved surface comprising, a resilient wiping element conformable to the surface to be wiped, a flexible backing strip for supporting said wiping element, said wiping element being freely tiltable relative to said backing strip, means for applying wiping pressure to said backing strip, a pair of members having their ends movably connected to said pressure applying means, the free ends of said members being operatively connected with said flexible backing strip, resilient means interconnecting spaced points on said pressure applying means and said members for deforming said flexible backing strip and wiping element, and means carried by one of said members and engageable with the surface to be wiped for limiting tilting of said wiping element relative to said backing strip.

11. The combination set forth in claim 10 wherein said last recited means comprises a roller carried by the outer end of said one member, the axis of said roller being spaced from the wiping edge of said wiping element.

12. A wiper for cleaning a curved surface comprising, a resilient wiping element conformable to the surface to be wiped, a flexible backing strip for supporting said wiping element, said wiping element being freely tiltable relative to said backing strip, means for applying wiping pressure to said backing strip, a pair of members having their ends movably connected to said pressure applying means, the free ends of said members being operatively connected with said flexible backing strip, resilient means interconnecting spaced points on said pressure applying means and said members for normally deforming said backing strip and said wiping element, and means carried by said backing strip and engageable with said wiping element for limiting tilting movement thereof relative to said backing strip.

13. The combination set forth in claim 12 wherein the last recited means comprise a plurality of fingers attached at longitudinally spaced points to said backing strip, and wherein said wiper assembly includes roller means engageable with the surface to be wiped for assisting said fingers in limiting tilting movement of said wiping element.

14. A wiper assembly for cleaning a curved surface including, a resilient squeegee readily conformable to the surface to be wiped, a flexible backing strip for supporting said squeegee, said squeegee being freely tiltable relative to said backing strip, a wiper arm for applying wiping pressure to said flexible backing strip, a pair of members having their ends pivotally connected at spaced points to said arm, a yoke movably connected intermediate its ends to the free end of one of said members, the ends of said yoke being movably connected with spaced points on said backing strip, the free end of the other of said members also being movably connected to said backing strip, and resilient means interconnecting spaced points on said arm and said members for normally deforming said flexible backing strip and said squeegee.

15. The combination set forth in claim 14 wherein said wiper arm is directly connected to a point on said backing strip for directly applying wiping pressure thereto.

16. A wiper assembly for cleaning a curved surface including, a resilient squeegee readily conformable to the surface to be wiped, a flexible backing strip for supporting said squeegee, said squeegee being freely tiltable relative to said backing strip, a wiper arm for applying wiping pressure to said flexible backing strip, a pair of members having their inner ends pivotally connected at spaced points to said arm, a yoke movably connected intermediate its ends to the outer end of one of said members, the ends of said yoke being movably connected with spaced points on said backing strip, the outer end of the other of said members also being movably connected to said backing strip, and a pair of springs having their inner ends anchored to said arm at points spaced from the pivotal connection between said members and said arm, the outer ends of said springs being connected to points on said members whereby the flexible backing strip and squeegee are normally deformed.

17. A wiper assembly for cleaning a curved surface including, a resilient squeegee readily conformable to the surface to be wiped, a flexible backing strip for supporting said squeegee, said squeegee being freely tiltable relative to said backing strip, a wiper arm for applying wiping pressure to said flexible backing strip, a pair of members having their inner ends pivotally connected at spaced points to said arm, a yoke movably connected intermediate its ends to the outer end of one of said members, the ends of said yoke being movably connected with spaced points on said backing strip, the outer end of the other of said members also being movably connected to said backing strip, resilient means interconnecting spaced points on said arm and said members for normally deforming said backing strip and said squeegee, and cooperable means on said members and said arm for limiting deformation of said squeegee by said springs.

18. A wiper assembly for cleaning a curved surface including, a resilient squeegee readily conformable to the surface to be wiped, a flexible backing strip for supporting said squeegee, said squeegee being freely tiltable relative to said backing strip, a wiper arm for applying wiping pressure to said flexible backing strip, a pair of members having their inner ends pivotally connected at spaced points to said arm, a yoke movably connected intermediate its ends to the outer end of one of said members, the ends of said yoke being movably connected with spaced points on said backing strip, the outer end of the other of said members also being movably connected to said backing strip, and a pair of springs having their inner ends anchored to said arm at a point spaced from and below the center of the pivotal connection between said arm and said members, the outer ends of said springs being anchored to points on said members whereby the force required to deflect said members from their normal position remains substantially constant.

19. A wiper assembly for cleaning a curved surface including, a resilient squeegee readily conformable to the surface to be wiped, a flexible backing strip for supporting said squeegee, said squeegee being freely tiltable relative to said backing strip, a wiper arm for applying wiping pressure to said flexible backing strip, a pair of members having their ends pivotally connected at spaced points to said arm, a yoke movably connected intermediate its ends to the free end of one of said members, the ends of said yoke being movably connected with spaced points on said backing strip, the free end of the other of said members also being movably connected to said backing strip, resilient means interconnecting spaced points on said arm and said members for normally deforming said backing strip and said squeegee, and means operatively associated with said squeegee for preventing crowding of said squeegee against said curved surface.

References Cited in the file of this patent

UNITED STATES PATENTS

| 1,670,266 | Marlow | May 15, 1928 |
| 2,672,641 | Scinta | Mar. 23, 1954 |

FOREIGN PATENTS

| 667,253 | Great Britain | Feb. 27, 1952 |
| 820,156 | France | July 26, 1937 |
| 1,033,521 | France | Apr. 1, 1953 |